US008573450B2

(12) United States Patent
Hsu et al.

(10) Patent No.: US 8,573,450 B2

(45) Date of Patent: Nov. 5, 2013

(54) ELECTRICAL CAULKING GUN

(75) Inventors: Chih-Hua Hsu, Taichung (TW); Chen-Chen Cheng, Taichung (TW); Rui-Heng Lin, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 137 days.

(21) Appl. No.: 13/209,829

(22) Filed: Aug. 15, 2011

(65) Prior Publication Data

US 2013/0043281 A1 Feb. 21, 2013

(51) Int. Cl.
*G01F 11/00* (2006.01)

(52) U.S. Cl.
USPC .......................................... 222/333; 222/386

(58) Field of Classification Search
USPC ........ 173/1–11, 13, 18–19, 141–161; 222/63, 222/137, 327, 333, 386, 390, 391, 571
See application file for complete search history.

(56) References Cited

U.S. PATENT DOCUMENTS 3,632,936 A * 1/1972 Piber .............................. 200/1 V
3,686,601 A * 8/1972 Kaczmarek et al. ............ 337/66
3,861,567 A * 1/1975 Davis, Jr. ...................... 222/333
4,296,290 A * 10/1981 Peot .............................. 200/325
4,488,664 A * 12/1984 Cleland .......................... 222/56
4,615,469 A * 10/1986 Kishi et al. .................... 222/327
4,669,636 A * 6/1987 Miyata ..................... 222/153.01
5,107,085 A * 4/1992 Roswold ....................... 200/531
5,450,988 A * 9/1995 Jerdee ........................... 222/333
5,556,009 A * 9/1996 Motzko ......................... 222/326
5,762,239 A * 6/1998 Cossette ....................... 222/326
5,775,539 A * 7/1998 Bates et al. ....................... 222/1
5,897,454 A * 4/1999 Cannaliato .................... 475/265
5,909,830 A * 6/1999 Bates et al. ................... 222/327
5,988,458 A * 11/1999 Messner ....................... 222/478
6,123,235 A * 9/2000 Hsu ............................... 222/327
6,318,604 B1 * 11/2001 Messner ....................... 222/478
6,540,113 B2 * 4/2003 Gardos ......................... 222/137
6,802,623 B1 * 10/2004 Hsu et al. ...................... 362/199
6,889,872 B2 * 5/2005 Herman et al. ................. 222/82
7,004,357 B2 * 2/2006 Shew ............................ 222/256
7,249,695 B2 * 7/2007 Shew ............................ 222/333
7,420,341 B2 * 9/2008 Glasgow et al. .............. 318/280
7,637,392 B2 * 12/2009 Hsu et al. ...................... 222/137
7,971,758 B2 * 7/2011 Campbell et al. ............. 222/391
7,997,456 B2 * 8/2011 Shew et al. ................... 222/333
8,011,538 B2 * 9/2011 Herman et al. ............... 222/326
8,020,727 B2 * 9/2011 Herman et al. ................... 222/1
8,251,158 B2 * 8/2012 Tomayko et al. ............... 173/47
2005/0034966 A1 * 2/2005 Krebs et al. .................. 200/341
2009/0039113 A1 * 2/2009 Hsu et al. ...................... 222/333

(Continued)

*Primary Examiner* — J. Casimer Jacyna
*Assistant Examiner* — Randall Gruby
(74) *Attorney, Agent, or Firm* — Tracy M. Heims; Apex Juris, pllc

(57) ABSTRACT

An electrical caulking gun has a gun body and a clutching device. The clutching device has a clutching switch, a linking lever, a clutching block and a block spring. The clutching switch is mounted on the gun body and has a pressed segment and a pushing segment having an inclined pushing surface. The linking lever is pivotally mounted in the gun body and has an abutting end and a pushing end. The abutting end abuts with the pushing surface of the clutching switch. The clutching block has an inclined pushed surface and an engaging rod. The engaging rod detachably engages a transmission device of the caulking gun. The block spring provides a force to push the engaging rod on the clutching block to engage the transmission device.

7 Claims, 8 Drawing Sheets

(56) References Cited

U.S. PATENT DOCUMENTS

| | | | | |
|---|---|---|---|---|
| 2009/0108046 | A1* | 4/2009 | Huang | 227/8 |
| 2010/0006605 | A1* | 1/2010 | Sung et al. | 222/327 |
| 2010/0012700 | A1* | 1/2010 | Perron et al. | 227/8 |
| 2010/0071920 | A1* | 3/2010 | Lau et al. | 173/1 |
| 2010/0116863 | A1* | 5/2010 | Suda | 227/8 |
| 2010/0170931 | A1* | 7/2010 | Viola | 227/175.1 |
| 2010/0301091 | A1* | 12/2010 | Liang et al. | 227/8 |
| 2011/0057014 | A1* | 3/2011 | Yang et al. | 227/8 |
| 2011/0068130 | A1* | 3/2011 | Mitrovic et al. | 222/386 |

* cited by examiner

ELECTRICAL CAULKING GUN

BACKGROUND OF THE INVENTION

1. Field of the Invention

The present invention relates to a caulking gun, and more particularly to an electrical caulking gun having high operation efficiency.

2. Description of Related Art

A conventional electrical caulking gun uses electrical power and a transmission device to drive a pushing rod into a tube to release silicone out from the tube to adhere the silicone onto an object for filling in or repairing. The conventional electrical caulking gun has a speed changing device to changing the moving speed of the pushing rod so as to release the silicone at different speeds.

In addition, after the silicone has been used up, the pushing rod has to be pull backward to the original position for replacing the used tube with a new one. For easily pulling the pushing rod to move backward, a clutching device is mounted on the conventional caulking gun to clutch the transmission device.

The clutching device of the conventional caulking gun is connected to the trigger of the conventional caulking gun. Before the trigger is pulled, the clutching device is disengaged from the transmission device and the transmission device is at a neutral gear stage. Therefore, the pushing rod can be moved backward easily. When the trigger is pulled, the clutching device is engaged with the transmission device to make the transmission device at the driving stage, such that the electrical power can be transmitted to the pushing rod via a motor and the transmission device to release the silicone. At this time, the pushing rod cannot be pulled backward manually due to the engagement between and the limitation provided by the transmission device and the motor.

However, the conventional clutching device connected to the trigger has to reengage the transmission device each time of the trigger being pulled, so the operation of the caulking gun may be delayed due to the reengaging time between the clutching device and the transmission device. Thus, the operation efficiency of the caulking gun is badly influenced and reduced.

In addition, the speed changing device of the conventional caulking gun can change the moving speed of the pushing rod to release the silicone at different desired speeds for different work needs. At the end or corner of the releasing travel of the silicone, the releasing speed of the silicone has to be slowed down to make the silicone to be adhered onto the end or corner evenly. However, the speed of the pushing rod cannot be changed during the movement of the pushing rod and only can be changed after the conventional caulking gun being stopped and then adjusted by the speed changing device. Accordingly, the release of the silicone is broken off and is not smooth, and the silicone cannot be adhered on the object evenly.

To overcome the shortcomings, the present invention tends to provide a caulking gun to mitigate or obviate the aforementioned problems.

SUMMARY OF THE INVENTION

The main objective of the invention is to provide an electrical caulking gun having high operation efficiency.

The electrical caulking gun in accordance with the present invention has a gun body, a pushing rod, a motor, a transmission device, a circuit board, a speed changing device, a trigger and a clutching device. The pushing rod is movably mounted on the gun body. The motor is connected to and drives the pushing rod to move relative to the gun body with the transmission device. The circuit board is mounted in the gun body and is electrically connected to the motor. The speed changing device is electrically connected to the circuit board to control rotating speed of the motor via the circuit board. The trigger is pivotally mounted on the gun body. The clutching device is mounted on the gun body at a position near the trigger and has a clutching switch, a linking lever, a clutching block, at least one switch spring and a block spring. The clutching switch is mounted on the gun body and has a pressed segment and a pushing segment. The pressed segment is exposed from the gun body. The pushing segment is integrally connected with the pressed segment, extends into the gun body and having an inclined pushing surface. The linking lever is pivotally mounted in the gun body and has an abutting end and a pushing end. The abutting end abuts with the pushing surface on the pushing segment of the clutching switch. The pushing end is opposite to the abutting end and extends into the gun body. The clutching block is movably mounted in the gun body and has an inclined pushed surface and an engaging rod. The inclined pushed surface is formed on one side of the clutching block. The engaging rod is formed on and protrudes from the clutching block and detachably engages the transmission device. The at least one switch spring is mounted between the clutching switch and the gun body to provide a force to push the clutching switch to extend out of the gun body. The block spring is mounted between the clutching block and the gun body to provide a force to push the engaging rod on the clutching block to engage the transmission device.

Other objects, advantages and novel features of the invention will become more apparent from the following detailed description when taken in conjunction with the accompanying drawings.

DETAILED DESCRIPTION OF PREFERRED EMBODIMENT

Figure 1:
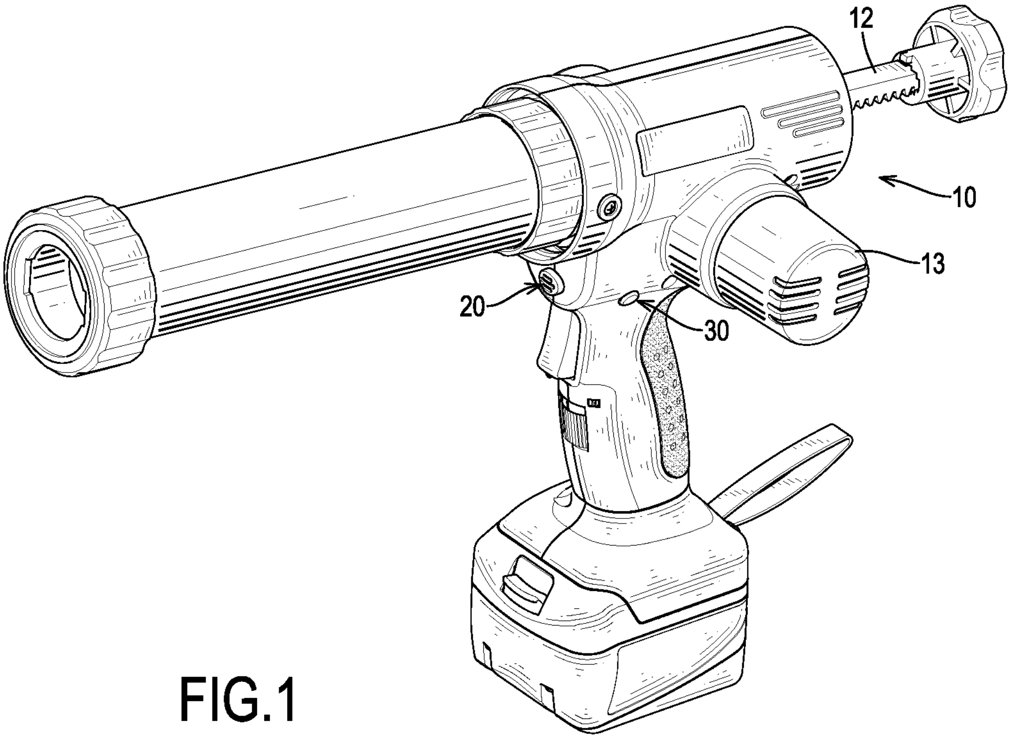
FIG. 1 is a perspective view of an electrical caulking gun in accordance with the present invention.
Figure 2:
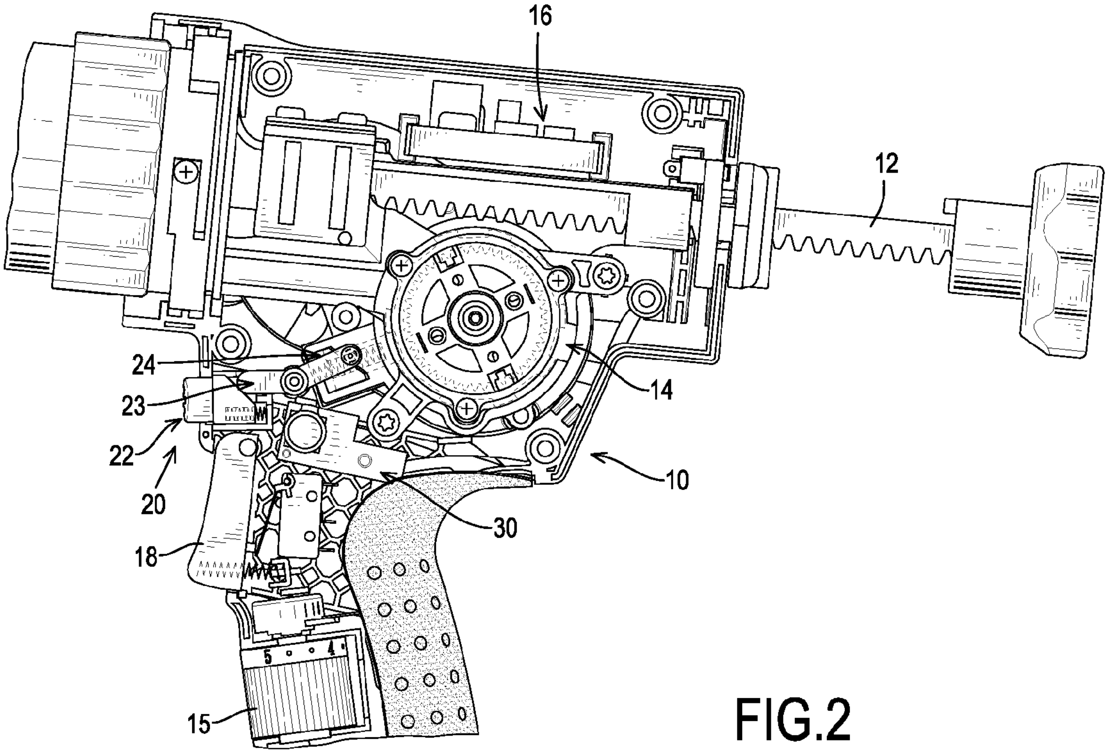
FIG. 2 is an enlarged side view in partial section of the electrical caulking gun in FIG. 1.

With reference to FIGS. 1 to 3 and 8, an electrical caulking gun in accordance with the present invention comprises a gun body 10, a pushing rod 12, a motor 13, a transmission device 14, a circuit board 16, a speed changing device 15, a trigger 18, a trigger switch 19, a clutching device 20 and a speed-changing switch 30. The pushing rod 12 is movably mounted on the gun body 10. The motor 13 is connected to and drives the pushing rod 12 to move relative to the gun body 10 with the transmission device 14. The transmission device 14 is mounted in the gun body 10 between the motor 13 and the pushing rod 12. The transmission device 14 may comprise sun gear set and a rack to transmit the power of the motor 13 to the pushing rod 12 so as to drive the pushing rod 12 to move relative to the gun body 10 and to release silicone from a tube. The circuit board 16 is mounted in the gun body 10 and is electrically connected to the motor 13. The speed changing device 15 is electrically connected to the circuit board 16 to control the rotating speed of the motor 13 via the circuit board 16. The circuit board 16 has electrical elements and a circuit, such that when the speed changing device 15 is rotated or pressed, the circuit board 16 may send a signal to the motor 13 to control and change the rotating speed of the motor 13. Consequently, the moving speed of the pushing rod 12 can be changed. The trigger 18 is pivotally mounted on the gun body 10. The trigger switch 19 is mounted in the gun body 10 and is pressed by the trigger 18. When the trigger 18 is pulled, the trigger switch 19 is pressed and the motor 13 is actuated to move the pushing rod 12 relative to the gun body 10. The gun body 10, the pushing rod 12, the motor 13, the transmission device 14, the circuit board 16, the speed changing device 15, the trigger 18 and the trigger switch 19 may conventional, so detail description of such theses components is omitted.

Figure 3:
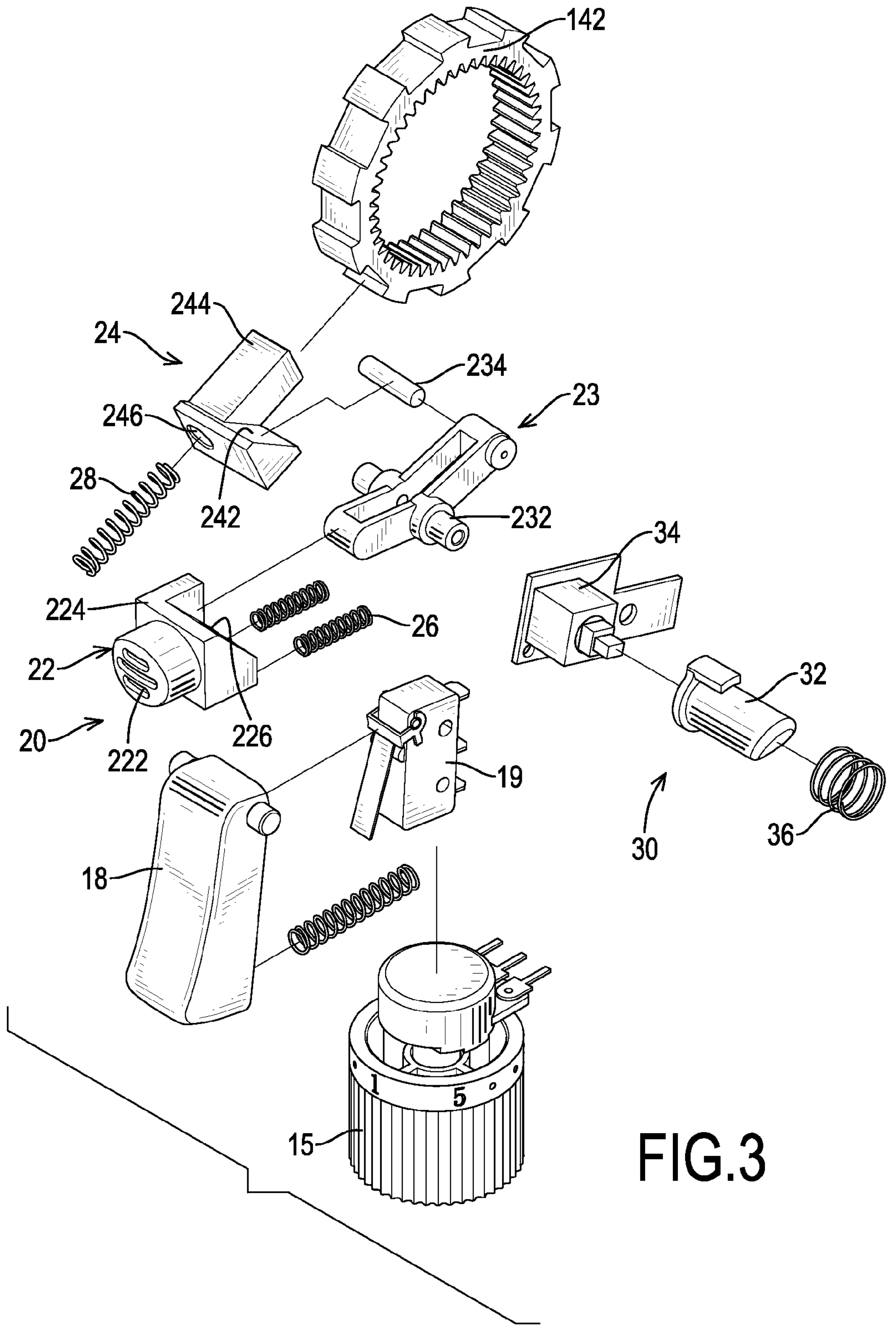
FIG. 3 is an exploded perspective view of the switching device and the speed-changing switch of the electrical caulking gun in FIG. 1.
Figure 4:
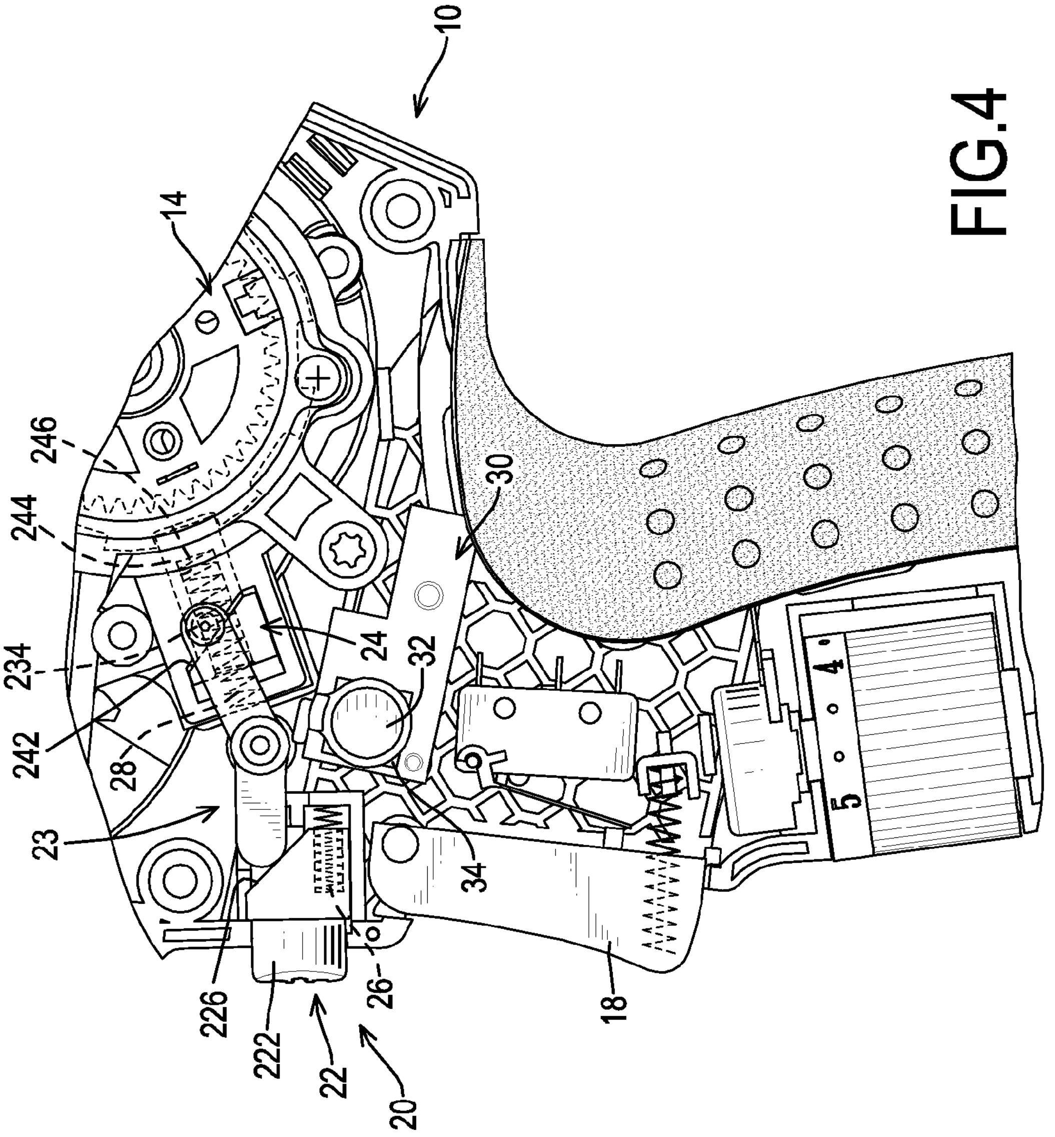
FIG. 4 is an enlarged side view in partial section of the switching device and the speed-changing switch of the electrical caulking gun in FIG. 1.
Figure 5:
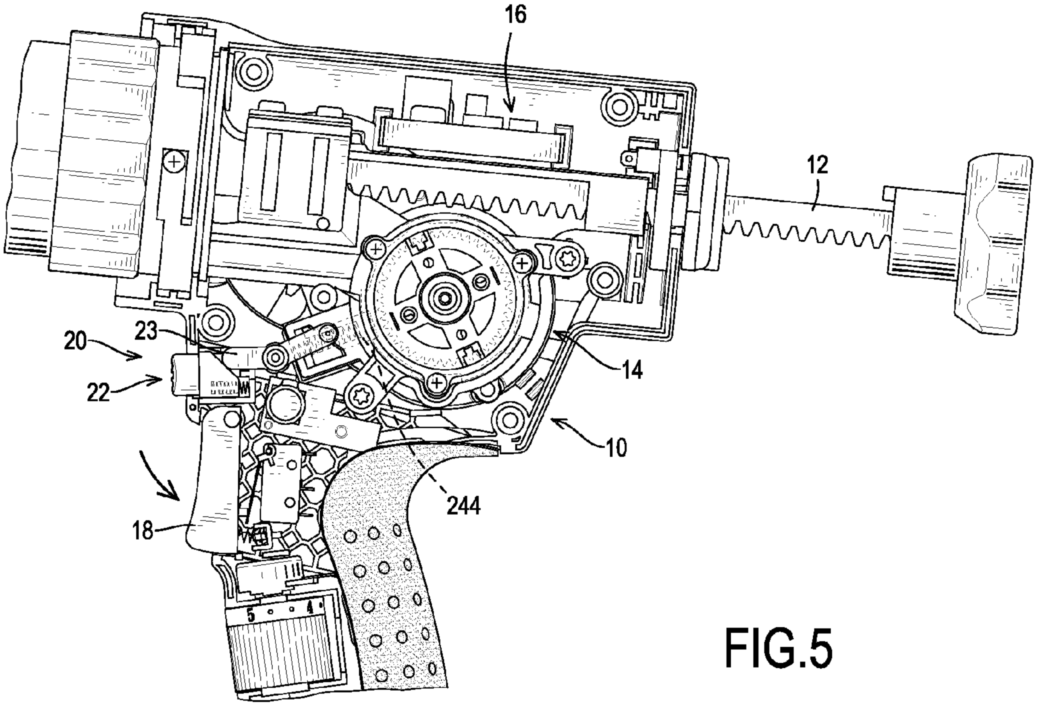
FIG. 5 is an operational side view in partial section of the electrical caulking gun in FIG. 1 showing the trigger being pulled.

With reference to FIGS. 3 and 4, the clutching device 20 is mounted on the gun body 10 at a position near the trigger 18 and comprises a clutching switch 22, a linking lever 23, a clutching block 24, at least one switch spring 26 and a block spring 28. The clutching switch 22 is mounted on the gun body 10 and comprises a pressed segment 222 and a pushing segment 224. The pressed segment 222 is exposed from the gun body 10 and may be cylindrical. The pushing segment 224 is integrally connected with the pressed segment 222, extends into the gun body 10 and has an inclined pushing surface 226.

The linking lever 23 is pivotally mounted in the gun body 10 and has an abutting end, a pushing end, a pivot pin 232 and a pushing pin 234. The abutting end abuts with the pushing surface 226 on the pushing segment 224 of the clutching switch 20. The pushing end is opposite to the abutting end and extends into the gun body 10. The pivot pin 232 is mounted on a middle of the linking lever 23 and is rotatably connected to the gun body 10 to pivotally connect the linking lever 23 to the gun body 10. The pushing pin 234 is mounted on the pushing end of the linking lever 23 and is parallel with the pivot pin 232.

The clutching block 24 is movably mounted in the gun body 10, abuts with the pushing end of the linking lever 23, preferably abuts with the pushing pin 234 on the linking lever 23 and has an inclined pushed surface 242, an engaging rod 244 and a spring hole 246. The pushed surface 242 is formed on one side of the clutching block 24 and abuts with the pushing pin 234 on the linking lever 23. The engaging rod 244 is formed on and protrudes from the clutching block 24 and detachably engages the transmission device 14. Preferably, when the transmission device 14 has a sun gear set, the engaging rod 24 is inserted into and engages with the teeth on the sun gear 142 of the sun gear set. The spring hole 246 is defined in one side of the clutching block 24, extends into the engaging rod 244 and has a bottom.

The at least one switch spring 26 is mounted between the clutching switch 22 and the gun body 10 to provide a force to push the clutching switch 22 to extend out of the gun body 10. Preferably, the at least one switch spring 26 abuts with the pressed segment 222 of the clutching switch 22.

The block spring 28 is mounted between the clutching block 24 and the gun body 10 to provide a force to push the engaging rod 244 on the clutching block 24 to engage the transmission device 14. The block spring 28 has one end extending into and held in the spring hole 246 and abutting with the bottom of the spring hole 246.

Accordingly, with reference to FIGS. 1, 2, 4 and 5, because the engaging rod 244 of the clutching block 24 keeps engaging the transmission device 14, the transmission device 14 is always at the operation stage. Therefore, when the trigger 18 is pulled, the motor 13 can be immediately actuated and drives the pushing rod 12 to move relative to the gun body 10 with the transmission of the transmission device 14. Accordingly, the reengaging time between the clutching device 20 and the transmission device 14 is eliminated, and the operation efficiency of the caulking gun can be improved.

Figure 6:
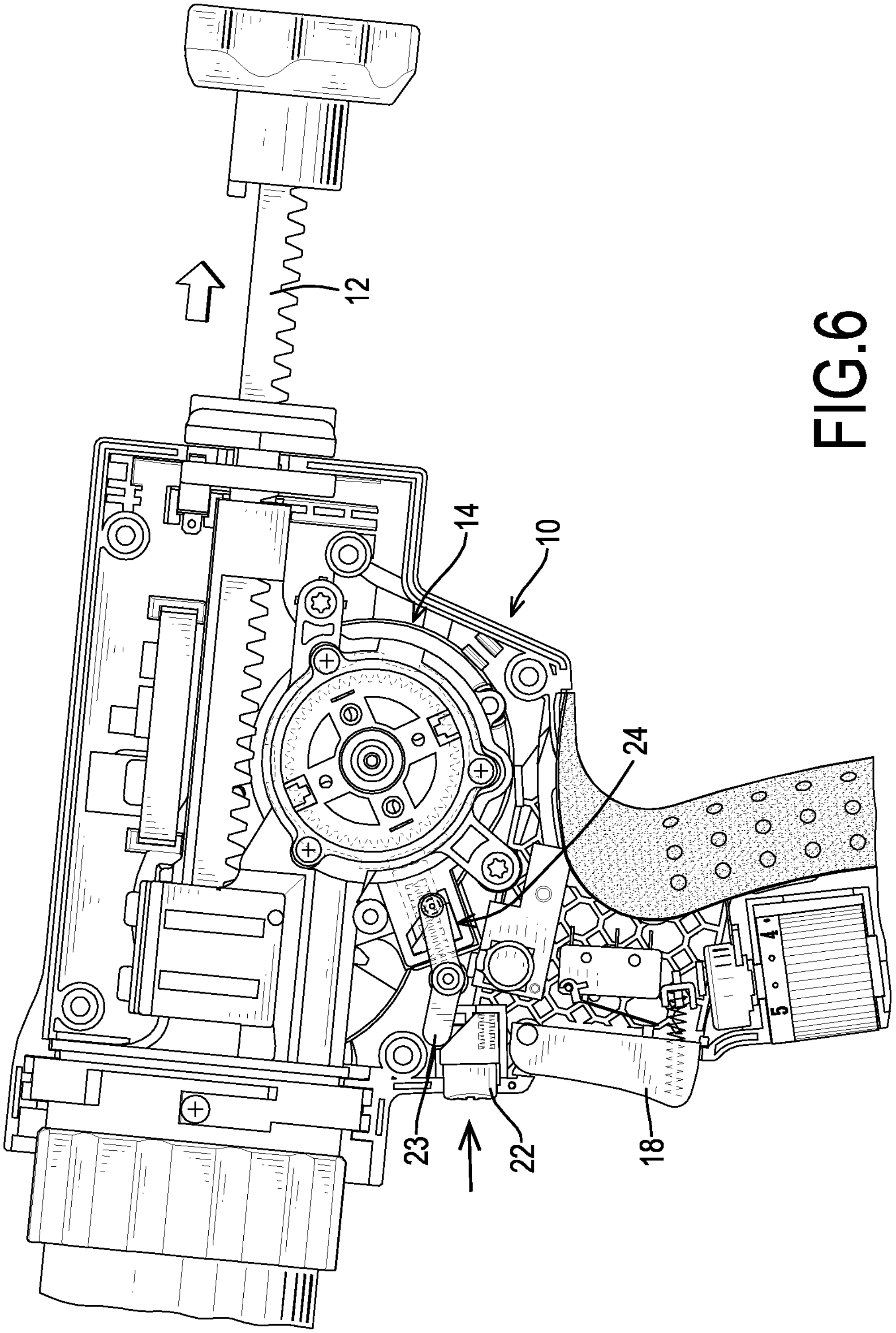
FIG. 6 is an operational side view in partial section of the switching device and the speed-changing switch of the electrical caulking gun in FIG. 1 showing the clutching switch being pressed and the pushing rod being pulled backward.
Figure 7:
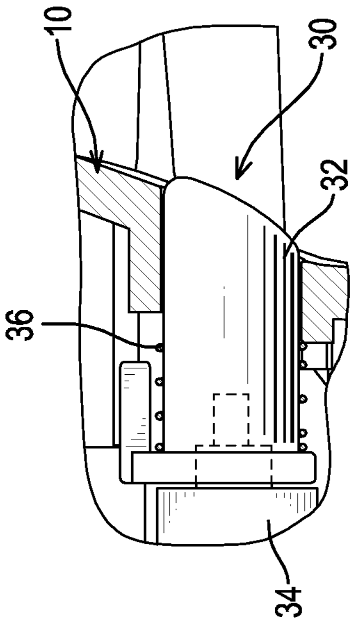
FIG. 7 is an enlarged side view in partial section of the speed-changing switch of the electrical caulking gun in FIG. 1.
Figure 8:
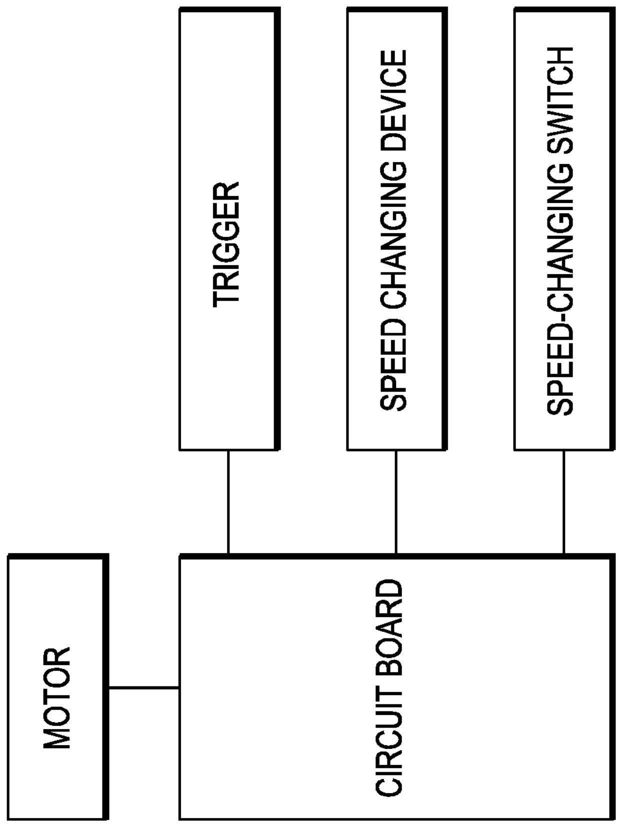
FIG. 8 is a block diagram of the electrical connection between the circuit board, the motor, the speed changing device and the speed-changing switch of the electrical caulking gun in FIG. 1.

When the silicone is used up, with reference to FIGS. 3 and 6, the clutching switch 22 is pressed into the gun body 10 and the linking lever 23 is pushed to pivot relative to the gun body 10 by the inclined pushing surface 226 on the clutching switch 22 pushing against the abutting end of the linking lever 23. With the pivotal rotation of the linking lever 23, the pushing pin 234 on the linking lever 23 will push against the pushed surface 242 on the clutching block 24 to move the clutching block 24 away from the transmission device 14. Consequently, the engaging rod 244 on the clutching block 24 is disengaged from the transmission device 14 to make the transmission device 14 at the neutral gear stage. Accordingly, the pushing rod 12 can be pulled manually to move backward to the original position for replaced the used silicone tube with a new one.

The speed-changing switch 30 is mounted on the gun body 10 and comprises a pushbutton 32, a pressed switch 34 and a button spring 36. The pushbutton 32 is mounted on and exposed from the gun body 10. The pressed switch 34 is mounted in the gun body 10, abuts with the pushbutton 32 and is electrically connected to the circuit board 16. The button spring 36 is mounted between the pushbutton 32 and the gun body 10 to provide a force to push the pushbutton 32 to extend out of the gun body 10. Preferably, the button spring 36 is mounted around the pushbutton 32 and has two ends abutting respectively with one end of the pushbutton 32 and an inner wall of the gun body 10.

When the pushbutton 32 is pressed, the pressed switch 34 is pressed by the pushbutton 32 and sends a signal to the circuit board 16. After the circuit board 16 receiving the signal sent from the pressed switch 34, the circuit board 16 will send a signal to the motor 13 to control and shift the motor 13 to rotate at the lowest speed no matter the speed changing device 15 is at any speed stage. Accordingly, the caulking gun can be shifted to the lower speed stage easily by pressing the pushbutton 32 to make the silicone being released at the lower speed for adhering the silicone onto the object evenly.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical caulking gun comprising:

a gun body;

a pushing rod movably mounted on the gun body;

a motor connected to and driving the pushing rod to move relative to the gun body with a transmission device;

a circuit board mounted in the gun body and electrically connected to the motor;

a speed changing device electrically connected to the circuit board to control rotating speed of the motor via the circuit board;

a trigger pivotally mounted on the gun body;

a trigger switch mounted in the gun body and pressed by the trigger; and a clutching device mounted on the gun body at a position near the trigger and comprising a clutching switch mounted on the gun body and comprising a pressed segment exposed from the gun body; and a pushing segment integrally connected with the pressed segment, extending in the gun body and having an inclined pushing surface;

a linking lever pivotally mounted in the gun body and having an abutting end abutting with the pushing surface on the pushing segment of the clutching switch; and a pushing end opposite to the abutting end and extending into the gun body;

a clutching block movably mounted in the gun body and having an inclined pushed surface formed on one side of the clutching block; and an engaging rod formed on and protruding from the clutching block and detachably engaging the transmission device;

at least one switch spring mounted between the clutching switch and the gun body to provide a force to push the clutching switch to extend out of the gun body; and a block spring mounted between the clutching block and the gun body to provide a force to push the engaging rod on the clutching block to engage the transmission device, wherein the linking lever further has a pushing pin mounted on the pushing end of the linking lever and abutting with the pushed surface of the clutching block; and the caulking gun assembly further comprising a speed-changing switch mounted on the gun body and comprising a pushbutton mounted on and exposed from the gun body;

a pressed switch abutting with the pushbutton and electrically connected to the circuit board; and a button spring mounted between the pushbutton and the gun body to provide a force to push the pushbutton to extend out of the gun body.

2. The caulking gun assembly as claimed in claim 1, wherein the button spring is mounted around the pushbutton and has two ends abutting respectively with one end of the pushbutton and an inner wall of the gun body.

3. The caulking gun assembly as claimed in claim 2, wherein the linking lever has a pivot pin mounted on a middle of the linking lever, being parallel with the pushing pin and rotatably connected to the gun body.

4. The caulking gun assembly as claimed in claim 3, wherein the clutching block has a spring hole defined in one side of the clutching block, extending into the engaging rod and having a bottom;

the block spring has one end extending into and held in the spring hole and abutting with the bottom of the spring hole.

5. The caulking gun assembly as claimed in claim 2, wherein the clutching block has a spring hole defined in one side of the clutching block, extending into the engaging rod and having a bottom;

the block spring has one end extending into and held in the spring hole and abutting with the bottom of the spring hole.

6. The caulking gun assembly as claimed in claim 1, wherein the linking lever has a pivot pin mounted on a middle of the linking lever, being parallel with the pushing pin and rotatably connected to the gun body.

7. The caulking gun assembly as claimed in claim 1, wherein the clutching block has a spring hole defined in one side of the clutching block, extending into the engaging rod and having a bottom;

the block spring has one end extending into and held in the spring hole and abutting with the bottom of the spring hole.

* * * * *